United States Patent [19]

Graham

[11] 4,367,139
[45] Jan. 4, 1983

[54] HOLLOW FIBER PERMEATOR

[75] Inventor: Tommy E. Graham, Raleigh, N.C.

[73] Assignee: Monsanto Company, St. Louis, Mo.

[21] Appl. No.: 961,342

[22] Filed: Nov. 16, 1978

[51] Int. Cl.³ .............................................. B01D 31/00
[52] U.S. Cl. .............................. 210/321.3; 210/433.2; 210/456
[58] Field of Search ........... 210/321 A, 321 B, 321 R, 210/23, 433 M, 456; 165/161

[56] References Cited

U.S. PATENT DOCUMENTS

| | | | |
|---|---|---|---|
| 1,601,874 | 10/1926 | Muhleisen | 257/239 |
| 2,049,748 | 8/1936 | Rathbun | 257/239 |
| 3,277,959 | 10/1966 | Withers | 165/159 |
| 3,339,341 | 9/1967 | Maxwell | 55/16 |
| 3,526,001 | 8/1970 | Smith | 210/23 |
| 3,528,553 | 9/1970 | Caracciolo | 210/321 |
| 3,755,034 | 8/1973 | Mahon | 156/169 |
| 3,838,776 | 10/1974 | Brun et al. | 210/321 |
| 3,958,630 | 5/1976 | Smith | 165/161 |
| 4,082,670 | 4/1978 | Joh | 210/195 R |
| 4,124,510 | 11/1978 | Joh | 210/321 B |
| 4,127,165 | 11/1978 | Small | 165/162 |

FOREIGN PATENT DOCUMENTS

| | | | |
|---|---|---|---|
| 2744855 | 4/1978 | Fed. Rep. of Germany | 210/321 B |
| 7602880 | 5/1976 | Netherlands | 210/321 A |
| 7602881 | 5/1976 | Netherlands | 210/321 B |

OTHER PUBLICATIONS

Development of Hollow Fine . . . Systems, OSW Report, 1971.

Primary Examiner—Frank A. Spear, Jr.
Assistant Examiner—E. Rollins Cross
Attorney, Agent, or Firm—Thomas E. Kelley

[57] ABSTRACT

The performance of axially-fed permeators comprising an essentially fluid impermeable tubular shell containing a plurality of selectively permeable hollow fibers suitable for the selective permeation of at least one fluid in a fluid mixture containing at least one other component, wherein the hollow fibers are positioned in a tubular shell and are assembled in the form of an elongated bundle, is enhanced by providing at least one flow diverter in the bundle. The flow diverter comprises a region of a plurality of hollow fibers embedded in a solid wherein the cross-sectional area of the flow diverter which is transverse to the orientation of the hollow fibers is a minor portion of the transverse cross-sectional area of the bundle sufficient to divert fluid flow within the bundle. Advantageously, the portion of the plurality of hollow fibers encompassed in the flow diverter is insufficient to significantly adversely affect the total available membrane surface area for the selective permeation. In one embodiment, the bundle of hollow fibers substantially completely fills the cross-section of the tubular shell, and the at least one region extends around the transverse cross-section of the bundle encompassing hollow fibers at the periphery of the bundle. Desirably this surrounding flow diverter does not significantly increase the packing factor of the hollow fibers in the zone of the bundle surrounded by the flow diverter, and the flow diverter is adapted to be in an essentially fluid tight relationship with the shell.

22 Claims, 2 Drawing Figures

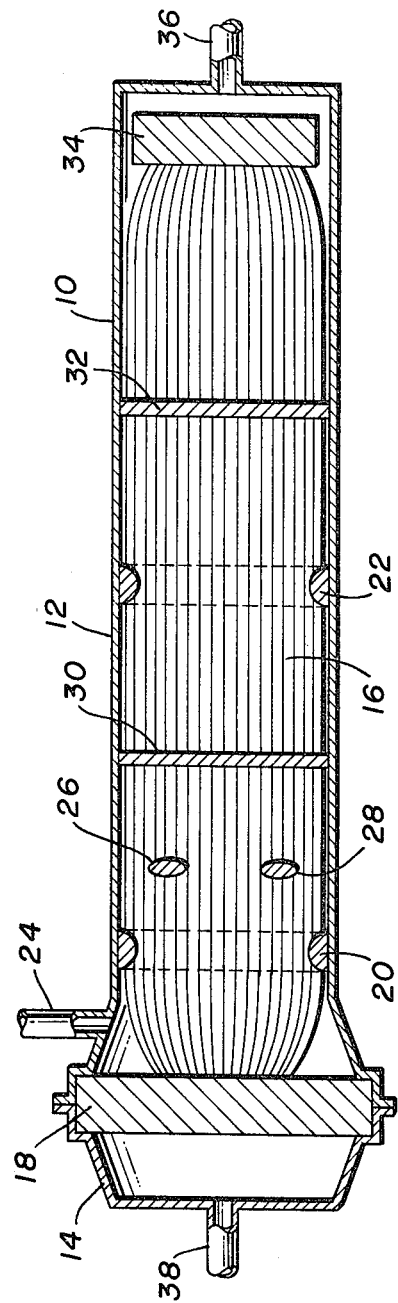

HOLLOW FIBER PERMEATOR

BACKGROUND OF THE INVENTION

This invention pertains to apparatus for separating at least one fluid from a fluid mixture containing at least one other component by selective permeation of the at least one fluid through membranes.

The use of membranes for separating at least one fluid from a fluid mixture containing at least one other component has long been suggested. In these membrane separations, permeable fluids in the fluid mixture (feed mixture) pass, under the influence of a driving force such as concentration, partial pressure, total pressure, etc., (depending on the nature of the membrane and separation operation) from a feed side of the membrane to a permeate side of the membrane. The fluid may pass through the membrane by interaction with the material of the membrane or by flow in interstices or pores present in the membrane. Separations effected by membranes can include gas-gas, gas-liquid, and liquid-liquid (including liquid-dissolved solid) separations.

The viability of the use of membranes for fluid separations as compared to other separation procedures such as absorption, adsorption, distillation, and liquifaction often depends on the cost including installation and operating costs, the degree of selectivity of separation which is desired, the total pressure losses caused by the apparatus for conducting the separation procedure which can be tolerated, the useful life of such apparatus, and the size and ease of use of such apparatus. Film membranes may frequently not be attractive as other separation apparatus due to the need for film membranes to be supported to withstand operating conditions and the overall complexity of apparatus containing film membranes. Membranes in the configuration of hollow fibers, or hollow filaments, may overcome some of the deficiencies of film membranes for many separation operations in that the hollow fibers are generally self-supporting, even during operating conditions, and provide a greater amount of membrane surface area per unit volume of separation apparatus than that which is provided by film membranes. Thus, separation apparatus containing hollow fibers may be attractive from the standpoint of convenience in size and reduced complexity of design.

The two approaches which have primarily been proposed for apparatus for fluid separations employing hollow fiber membranes use a plurality of the hollow fibers generally parallelly arranged in an elongated bundle. One approach includes transversely-fed permeators, e.g., radially-fed permeators, in which separation apparatus the fluid at the exterior of the hollow fibers primarily passes through the permeator transverse to the predominant longitudinal orientation of the hollow fibers. The other approach includes axially-fed permeators, e.g., separation apparatus wherein the fluid at the exterior of the hollow fibers primarily passes through the permeator in the same direction as the longitudinal orientation of the hollow fibers; however, there must be some transverse flow of fluid such that the fluid is distributed in the bundle. Transverse flow of the fluid among the hollow fibers in axially-fed permeators is at least partially due to dispersions caused by back pressures to fluid flow in the permeator, that is, the path of least resistance for the fluid flow must be transverse to the orientation of the hollow fibers in order to obtain the desired transverse flow. The efficiency of separation for a hollow fiber-containing permeator is dependent on the effective fluid distribution of the fluid at the exterior of the hollow fibers. In some instances, transversely-fed permeators can exhibit greater efficiencies of separation than do axially-fed permeators. In a transversely-fed permeator, the fluid must transversely pass among the hollow fibers, and thus dispersion of the fluid through the bundle is effected using the primary direction of flow of the fluid. On the other hand in axially-fed permeators, the fluid dispersion among the hollow fibers in the permeator is not so ensured. Despite the deficiencies which may exist in fluid dispersion around the exteriors of the hollow fibers in axially-fed permeators, such permeators offer significant advantages in terms of reduced construction difficulties and complexity over transversely-fed permeators. Another significant advantage of axially-fed permeators is the benefit of cocurrent or countercurrent flow patterns that can be obtained with respect to the passage of fluid in the bores and at the exteriors of the hollow fibers.

While the efficiency of separation of axially-fed permeators might be enhanced by introducing the feed mixture into the bores of the hollow fibers, especially in separation operations in which no sweep fluid is utilized on the permeate side of the membrane, this procedure is often undesirable due to the significant pressure drops which might be encountered in the passage of the fluid mixture through the bores of the hollow fiber. Even with bore feed, some sacrifice in separation efficiency may still occur due to poor distribution of permeate, for instance, localized regions, or pockets, of permeate on the shell side of the hollow fibers. Moreover, in some separation operations it is desirable to provide the feed mixture at the exterior of the hollow fibers since the feed mixture is at a higher total pressure than the total pressure on the permeate side of the membrane. Furthermore, if fouling of the membrane due to components in the feed mixture is a problem, less available membrane surface area may be lost where the fouling is at the exterior of the hollow fibers rather than blocking or partially blocking any of the bores of the hollow fibers. Additionally, the fabrication of the permeator may be facilitated since when the fluid mixture containing the fluid to be separated is contacted with the exterior of the hollow fibers, often only one end of each of the hollow fibers need be fabricated into a seal, or tube sheet, to enable fluid communication from the bores of the hollow fibers to the exterior of the permeator. Accordingly, a means to enhance the efficiencies of separation of axially-fed permeators are sought.

The efficiencies of separations using axially-fed permeators can adversely be affected by the formation of longitudinal flow channels. Often channeling can be observed in the region between the shell and the bundle. These flow channels may be formed by, for instance, the movement of the hollow fibers caused by the forces of fluid flow or by gravity (e.g., settling). The fluid on the shell side of the hollow fibers will preferentially pass through the longitudinal flow channels as opposed to dispersing among the hollow fibers since the total pressure drop incurred by the fluid passing through the channel is generally inversely proportional to the diameter of the channel to the fourth power. Thus, even small increases in the diameter of the channel can result in substantial reduction of pressure drop to the fluid flow. Hence, the transverse dispersion of the fluid will be adversely affected. Accordingly, losses in efficiencies of separation can result.

One method for reducing the effect of channeling is to increase the number of hollow fibers in the permeator such that deleterious channels can not readily form. However, as the number of hollow fibers increases the difficulty of insertion of the hollow fibers into the shell of the permeator also increases. Clearly, the insertion of the hollow fibers into the shell must be conducted without incurring undue damage to the hollow fibers. Moreover, even slight increases in packing factors caused by increasing the number of hollow fibers in the permeator have been found to provide much greater resistances to fluids dispersing in a transverse direction among the hollow fibers. Maxwell, et al., in U.S. Pat. No. 3,339,341, disclose a hollow fiber separation apparatus in which the fluid mixture containing the fluid to be separated is fed to the bores of the hollow fibers. The patentees indicate at column 5, lines 24 et seq., that packing densities over 40 percent are preferred and that at these packing densities do not prevent all movement of fluid into and out of the bundles between hollow fibers, but they do cause the fluids outside of the hollow fibers to flow along and in the direction of the hollow fibers. This objective may thus be contrary to obtaining good radial dispersion of fluids among hollow fibers in a permeator. Maxwell, et al., state that the use of a sweep gas at the exteriors of the hollow fibers is a preferred mode of operation (see column 7, line 5, et seq.). Apparently the radial distribution desired by Maxwell, et al., when employing a sweep fluid is fostered by utilizing a plurality of spaced apart sub-groups, or sub-bundles, such that the sweep fluid could radially pass between the sub-bundles. Consequently, in view of the lesser diameter the sweep fluid can more readily disperse into the mid-portion of a sub-bundle than from the outside into the mid-portion of a bundle not containing these sub-bundles. Unfortunately, the preparation of sub-bundles requires additional processing steps in the fabrication of separation apparatus and also channels may exist between sub-bundles which reduce the efficiency of separation of the separation apparatus.

In view of the difficulties in fabricating axially-fed permeators which exhibit commercially desirable efficiencies of separation, it is not surprising that little research and development efforts have been expended on the fabrication of axially-fed permeators. Rather, significant efforts have been devoted to the fabrication of, e.g., transversely-fed permeators in which the development of high efficiencies of separation can be more assured, especially if the feed mixture is to be fed to the exteriors of the hollow fibers. However, as pointed out above, axially-fed permeators can provide significant advantages over radially-fed permeators if non-complex means are provided to reliably increase the efficiencies of separations exhibited by axially-fed permeators.

In the copending patent application of Bollinger, U.S. patent application Ser. No. 961,343, filed on the same date herewith, there is described axially-fed permeators in which the efficiencies of separation exhibited by the permeators are increased by utilizing barrier bands surrounding the bundle of hollow fibers. The barrier band is adapted to provide a localized zone of increased lateral compaction of the bundle. While the fabrication of axially-fed permeators containing barrier bands may be relatively straightforward, the steps of fashioning the barrier band, providing the barrier band around the bundle, and providing the laterally compacted zone must be accomplished.

By this invention axially-fed permeators containing hollow fiber separation membranes for separating by the selective permeation of at least one fluid from a fluid feed mixture containing at least one other component are provided which permeators can exhibit highly desirable efficiencies of separation due to enhanced dispersion of fluid at the exterior of the hollow fibers. Advantageously, the axially-fed permeators of this invention can be fabricated employing large number of hollow fibers closely adjacent to one and another to make efficient utilization of the volume of the permeators; however, the permeator can be fabricated without undue difficulties or risk of damage to the hollow fibers. The benefits of the permeators of this invention can be achieved with relatively non-complex modifications of existing axially-fed permeator designs. Moreover, many existing axially-fed permeators may be readily modified to provide permeators in accordance with this invention which exhibit enhanced efficiencies of separation.

SUMMARY OF THE INVENTION

The axially-fed permeator of this invention for separating by selective permeation at least one fluid from the fluid feed mixture containing at least one other component comprises an elongated, essentially fluid impermeable tubular shell having at least one end adapted to receive a tube sheet; a plurality of selectively permeable hollow fibers, said hollow fibers having an exterior surface (shell-side) and a bore and said fibers being generally parallelly positioned within the tubular shell in the form of an elongated bundle; at least one tube sheet, said tube sheet being in fluid tight relationship with said shell wherein at least one end of each of said hollow fibers is embedded in a fluid tight relationship in said tube sheet and wherein said bores of said hollow fibers communicate through said tube sheet; at least one fluid ingress port communicating through said shell and at least one longitudinally distant fluid egress port communicating through said shell, said ingress and egress ports being in communication with the exteriors of the hollow fibers and adapted to provide axial flow of fluid in said shell; and at least one fluid flow diverter in said bundle, said flow diverter comprising a region of a plurality of hollow fibers embedded in a solid wherein the cross-section of the flow diverter which is transverse to the orientation of the hollow fibers is a minor portion of the transverse cross-section of the bundle sufficient to divert fluid flow within the bundle. Advantageously, the portion of the plurality of hollow fibers embedded in the solid to form the flow diverter is insufficient to unduly adversely affect the total available membrane surface area. Generally it is preferred that the bundle substantially fills the cross-section of the tubular shell. Permeators in accordance with this invention can exhibit enhanced efficiencies of fluid separation.

BRIEF DESCRIPTION OF THE DRAWING

The drawing is a schematic, longitudinal, cross-sectional representation of an axially-fed, hollow fiber permeator.

DETAILED DESCRIPTION OF THE INVENTION

In an embodiment of this invention, the flow diverter may extend around the periphery of the bundle and hollow fibers at the periphery of the bundle are embedded in the solid. Preferably, the flow diverters of this embodiment of this invention are adapted to be in contact with the interior surface of the shell such that little, if any, fluid passes between the flow diverter and the shell. Thus, fluid flowing between the periphery of the bundle and the shell will be directed by the flow diverter into the interior of the bundle.

In another embodiment of the invention, which embodiment may or may not be employed in conjunction with the embodiment of the invention in which a flow diverter extends around the periphery of the bundle, the flow diverter is positioned within the bundle. The flow diverter of this embodiment of the invention can be in any suitable configuration, for instance, it can be surrounded by hollow fibers which are not embedded therein, and may even surround hollow fibers which are not embedded therein, e.g., such as an annular ring. The flow diverters are sufficient to divert fluid flow on the shell side of the bundle to enhance fluid dispersion among the hollow fibers in the bundle and enhance selectivities of separation. Moreover, the flow diverter can advantageously provide support to at least the hollow fibers embedded in the solid and thus can minimize the settling or movement during separation operations of at least these hollow fibers. Accordingly, the stability of the hollow fiber bundle against forming flow channels can be enhanced thereby providing desirable efficiencies of separation.

In the embodiment of the invention in which the flow diverter extends around the periphery of the bundle, the number of flow diverters which extend around the periphery of the bundle can vary widely. In some permeators, one flow diverter which extends around the periphery of the bundle may be adequate to provide suitable efficiencies of separations. On the other hand, the flow diverters may be as close as about 10 centimeters to each other over the length of the bundle. Hence, up to about 50 or more flow diverters which extend around the periphery of the bundle may be employed in certain permeators in accordance with this invention. The positioning of the at least one flow diverter which extends around the periphery of the bundle may also widely vary. Generally, at least one flow diverter which surrounds the bundle is positioned proximate to the fluid ingress port since channeling frequently occurs in the region of the bundle at which the fluid is introduced and since the flow diverter can provide enhanced transverse fluid dispersion in the initial portion of the permeator. Frequently, this fluid diverter is within about one-quarter of the length of the permeator to the fluid ingress means, e.g., often within about 50 centimeters of the fluid ingress means. Any other flow diverters which surround the bundle can be spaced apart equally or unequally as desired. Preferably, a sufficient number and suitable positioning of flow diverters which extend around the periphery of the bundle is employed such that undue longitudinal channeling of the fluid passing on the shell side of the bundle between the bundle and the interior of the shell does not occur. Frequently, when more than one flow diverter extending around the periphery of the bundle are employed, the flow diverters are generally less than about 2 meters apart, say, about 0.15 to 2, e.g., about 0.2 to 1, meters apart.

Flow diverters which are within the bundle, hereinafter referred to as interior flow diverters, may be used with or without flow diverters which extend around the periphery of the bundle. These interior flow diverters can be any suitable configuration to promote transverse distribution of fluid at the exteriors of the hollow fibers. The interior flow diverters can often provide enhanced stability against the formation of flow channels. For instance, the flow diverter can be in the general shape of a straight or curved rod which can be substantially transverse to the direction of axial fluid in the bundle. The flow diverter may simply be a generally circular or disc-shaped agglomeration of the hollow fibers and the solid. The number of interior flow diverters which can be advantageously employed may vary substantially. For instance, if flow diverters which extend around the periphery of the bundle are employed, it may not be necessary to employ interior flow diverters to obtain desirable fluid distribution. However, often the interior flow diverters can be advantageously utilized in connection with at least one flow diverter extending around the periphery of the bundle to provide desirable flow patterns, and, if desired, further stabilize the bundle against the formation of flow channels. Advantageously, the interior flow diverters are sufficiently far apart from each other and flow diverters extending around the periphery of the bundle, if present, that an undue pressure drop does not occur. For example, if the flow diverters are positioned such that fluid which is significantly diverted by an upstream flow diverter is further significantly diverted by a downstream flow diverter, the upstream and downstream flow diverters are frequently at least about 10, say, about 10 to 100 or 150, centimeters apart. Frequently, when more than one interior flow diverter is employed, the interior flow diverters are off-set. The off-set between such sequential flow diverters with reference to a plane perpendicular to the orientation of the hollow fibers is sufficient to provide the desired fluid distribution yet not result in an undue pressure drop. Often, these flow diverters do not overlap with respect to a plane perpendicular to the orientation of the hollow fibers such that a greater cross-sectional area of the bundle is stabilized than if the flow diverters overlapped. Generally, with respect to a plane perpendicular to the orientation of the hollow fibers, the flow diverters will be at least about 0.5, say, at least about 2, e.g., about 2 to 20, centimeters apart.

It is desired that the flow diverters employed in the permeators of this invention not unduly increase the packing factor of the adjacent hollow fibers in the bundle. Packing factors are commonly used to express the amount of lateral compaction of the bundle. The packing factor is generally defined as the percent of the transverse cross-section of the bundle which is occupied by the hollow fibers. Usually, when the bundle is adapted to substantially fill the cross-sectional dimensions of a shell with hollow fibers, the packing factor is based on the transverse cross-sectional area of the hollow fibers and the number of hollow fibers in the bundle divided by the cross-sectional area of the interior of the shell. Significant increases in the lateral compaction of the hollow fibers in the bundle may unduly increase the resistance to axial flow through the bundle as well as provide a risk of damage to the hollow fibers during assembly of the permeator.

The flow diverter may have any suitable cross-sectional dimensions and thicknesses. The thickness of the flow diverter is the length of the hollow fiber encompassed within the solid to form the flow diverter. Preferably, the thickness of the flow diverter is relatively narrow to avoid undue loss of membrane surface areas. In many instances, the thickness of the flow diverter is less than about 10, preferably less than about 5, say, about 0.5 to 5, centimeters. The cross-sectional dimensions of the flow diverter are the dimensions of the face of the flow diverter which obstructs the flow of fluid in the permeator. Frequently, the cross-sectional dimensions of the flow diverter are referred to in terms of the effective diverter dimensions. The effective diverter dimension is herein defined as the dimension of the flow diverter projected on a plane perpendicular to the orientation of the hollow fibers. Hence, with a flow diverter having a dimension of, say, 2 centimeters, but that dimension is at an angle of 45° with the hollow fibers, would have a corresponding effective diverter dimension of about 1.4 centimeters. Preferably, the minor effective diverter dimension (i.e., smallest dimension of the effective diverter dimension) is sufficiently small to avoid causing an undue pressure drop to fluid passing around the diverter. For instance, the minor effective diverter dimension is often less than about 20 centimeters, say, about 0.5 to 10 or 20 centimeters. Most often the effective diverter surface area is less than about 25 percent, e.g., about 2 to 25 percent, of the interior cross-sectional area of the shell. When the flow diverter is in the configuration of a band (straight or curved) having a much larger length than width or an annular band, the effective diverter width of the band is often less than about 10 centimeters, e.g., about 0.5 to 10 centimeters. When the flow diverter has an effective diverter dimension in the configuration of, say, a circle, oval, triangle, or other high ratio of minor to major dimension-form, the major effective diverter dimension is sometimes less than about 50, say, about 2 to 30, centimeters, and is preferably less than about 50, say, about 2 to 30, percent of the major cross-sectional dimension of the shell. Generally the total cross-sectional area of the bundle occupied by the flow diverter is less than about 25 percent, e.g., about 3 to 25 percent.

The flow diverters can be fabricated in any suitable manner. The flow diverters may be formed within the bundle during fabrication of the bundle or may be formed within the bundle after the bundle has been fabricated. Preferably, the hollow fibers are embedded in the solid in an essentially fluid tight relationship such that little, if any, fluid can pass between the solid and the hollow fibers embedded therein. The solid which is utilized to surround the hollow fibers can be in solid form when contacted with the hollow fibers but, preferably, is a solidifiable liquid (e.g., wax, solder, polymeric resin, etc.). The solidifiable liquid may be solidified by, e.g., cooling or chemical reaction including curing reactions. The solidifiable liquid may also contain fillers or other additives including additives which alter the physical or chemical properties of the solid such as blowing agents to create a foam-type solid structure. The solidification may occur prior to or subsequent to the installation of the bundle in the shell. When the solidification of the solidifiable liquid, e.g., a polymeric resin, occurs in the shell, the solidification process may be initiated or enhanced by a fluid which is passed through the shell, e.g., a curing agent-containing fluid or fluid which activates, for instance, a blowing agent.

When the flow diverter is formed within the bundle during fabrication of the bundle, the material for the solid can be deposited on the hollow fibers before or during assembly of the hollow fibers to fabricate the bundle. Thus, the bundle will contain the material for the solid of the flow diverters upon completion of the assembly of the hollow fibers. Suitable means for providing a solidifiable liquid on the hollow fibers during assembly of the bundle include modification of procedures such as disclosed in U.S. Pat. Nos. 3,455,460 (Mahon) and U.S. Pat. No. 2,690,465 (McGinnis, et al.), both of which are incorporated herein by reference, in which a solidifiable liquid is selectively deposited on portions of the exteriors of hollow fibers, which portions are intended to be joined in the flow diverter.

The flow diverters can be formed after assembly of the bundle of hollow fibers. For instance, flow diverters which extend around the hollow fiber bundle can be formed by applying a solidifiable liquid to the periphery of the bundle at the desired location for the flow diverter. The solidifiable liquid can penetrate for a distance into the bundle and then be solidified to form the flow diverter. Alternatively, the solidifiable liqulid can be on the interior wall of the shell, and the bundle can be inserted in the shell and thus contacts the solidifiable liquid at the desired position for the flow diverter. This procedure may be advantageous in that a fluid tight relationship between the shell and the flow diverter can be easily provided. A solidifiable liquid may be injected into the bundle, e.g., using an injection tube, to form flow diverters within the bundle. These flow diverters can thus be formed in any desired configuration. Since the location at which the solidifiable liquid is introduced into the bundle can be widely selected, flow diverters can be positioned in order to provide desirable flow patterns for fluid separation in the permeator.

With reference to the drawing a schematic, longitudinal, cross-sectional representation of an axially-fed, hollow fiber permeator in accordance with this invention is depicted. The permeator is designated generally by the numeral 10. Permeator 10 comprises shell 12 which is adapted to receive a tube sheet at one end. Shell 12 may be comprised of any suitable fluid impervious material such as metals and plastics. In many permeators, metals such as steel are employed due to their ease of fabrication, durability, and strength. The shell may be in any suitable cross-sectional configuration; however, generally circular cross-sections are preferred. Shell 12 is closed at the seal end with end cap 14.

Bundle 16 composed of a plurality of hollow fibers is positioned within shell 12. Often the bundle comprises over 10,000 hollow fibers, and with smaller diameter hollow fibers and larger diameter shells, there may be an excess of 100,000 or even in an excess of one million hollow fibers. As depicted, the bundle has essentially the same cross-sectional configuration as that of the shell. One end of each of the hollow fibers in bundle 16 is embedded in tube sheet 18. The bores of the hollow fibers communicate through tube sheet 18. Tube sheet 18 is mounted in an essentially fluid tight relationship with shell 12 by end cap 14 by being positioned between shell 12 and end cap 14. O-rings or other similar devices may be employed to ensure achieving the desired fluid tight relationship. The tube sheets may be formed in any suitable manner, e.g., casting a potting material around the end of the bundle such as disclosed in U.S. Pat. No. 3,339,341 (Maxwell, et al.) and U.S. Pat. No. 3,442,389 (Mendelson) or by impregnating the ends of the hollow fibers with potting material while assembling the hollow fibers to form the bundle such as disclosed in U.S. Pat. No. 3,455,460 (Mahon) and U.S. Pat. No. 3,690,465 (McGinnis, et al.), all of which patents are incorporated herein by reference. Suitable potting materials include settable liquid polymeric compositions (such as epoxies, urethanes, etc.), solders, cements, waxes and the like.

Within bundle 16 are positioned a plurality of flow diverters in accordance with this invention. Flow diverters 20 and 22 are substantially annular rings containing solid material having hollow fibers embedded therein, which annular rings extend around the periphery of the hollow fiber bundle. Flow diverters 20 and 22 contact the interior wall of shell 12 in an essentially fluid tight relationship. Flow diverter 20 is positioned closely adjacent inlet port 24 (which extends through shell 12 and serves to provide fluid communication to the exterior of the hollow fibers) such that fluid distribution within the bundle is rapidly achieved upon introduction of the fluid into the shell side of the permeator. Flow diverter 22 is illustrated as being positioned downstream from flow diverter 20 and serves to further enhance fluid dispersion into the bundle as well as mitigate the effects of any longitudinal channeling along the periphery of the bundle between flow diverters 20 and 22.

Flow diverters 26 and 28 are substantially circular agglomerations of solid material having hollow fibers embedded therein. These flow diverters assist in dispersion of fluid passing through the shell side of the permeator. Although only two of these generally circular flow diverters are depicted, it is to be realized that a plurality of these flow diverters may be employed throughout the bundle to provide desired fluid dispersions. Flow diverters 30 and 32 are shown as substantially rod-like members which extend substantially perpendicular to the orientation of the hollow fibers and substantially perpendicular to the direction of axial flow in the permeator. A plurality of these rod-like flow diverters may be parallelly spaced in a plane perpendicular to the orientation of the hollow fibers and can serve not only to enhance the fluid dispersion in the permeator but also to support the hollow fibers and thereby reduce the formation of fluid flow channels which may be created due to the effects of settling, e.g., caused by forces of gravity, or by the passage of fluids through the bundle. Accordingly, if the permeator is intended to be oriented in a horizontal orientation, it may be preferred to position the rod-like flow diverters 30 and 32 in a substantially vertical direction.

The other end of the hollow fibers in bundle 16 are sealed in end seal 34 through which the bores of the hollow fibers do not communicate. End seal 34 may be composed of the same material as seal 18 and may be formed in substantially the same manner.

The end of shell 12 approximate to end seal 34 is provided with port 36. Thus, in the operation of the permeator depicted in the drawing, a fluid mixture containing the at least one fluid to be separated by selective permeation enters permeator 10 through port 24, passes through bundle 16, and exits the permeator via port 36. The at least one fluid which permeates the hollow fibers passes in the bores of the hollow fibers through seal 18 and exits permeator 10 via port 38 in end cap 14.

It has been found that enhanced fluid dispersions through the hollow fiber bundle of axially-fed permeators are obtained with higher space velocities. Accordingly, smaller bundle diameters are often preferred, e.g., about 0.02 or 0.05 to 0.5 meter in diameter. The effective length of the hollow fibers in the bundle may also vary widely, for instance, from about 0.2 to 15 or 20 meters, e.g., about 1 to 10 meters. Generally, with bundles having larger diameters, desirable dispersions can be obtained with the use of longer bundle lengths. The packing factor of the hollow fibers in the permeator based on the inside cross-sectional dimensions of the permeator shell over the length of hollow fiber having surface area available to effect separations and the cross-sectional area of the hollow fibers (hereafter sometimes referred to as the reference packing factor) is preferably at least about 35, say, about 40 or 45 to 55 or 60, percent.

The hollow fibers may be fabricated from any suitable synthetic or natural material suitable for fluid separations or as supports for materials which effect the fluid separations. The material for forming the hollow fibers may be inorganic, organic or mixed inorganic and organic. Typical inorganic materials include glasses, ceramics, cermets, metals and the like. The organic materials are usually polymers. In the case of polymers, both addition and condensation polymers which can be fabricated in any suitable manner to provide hollow fibers are included. Generally organic and sometimes organic polymers mixed with inorganics (e.g., fillers) are used to prepare the hollow fibers. The selection of the material for the hollow fiber may be based on the heat resistance, chemical resistance, and/or mechanical strength of the hollow fiber as well as other factors dictated by the intended fluid separation for which it will be used and the operating conditions to which it will be subjected.

Hollow fiber diameters may be selected over a wide range; however, the hollow fiber should have sufficient wall thickness to provide adequate strength to the hollow fiber. Frequently, the outside diameter of the hollow fibers is at least about 20, say, at least about 50, microns, and the same or different outside diameter fibers may be contained in a bundle. Often, the outside diameters are up to about 800 or 1000 microns. Although larger outside diameter hollow fibers can be employed, they are less preferred due to the low ratios of hollow fiber surface area per unit volume of fluid separation apparatus which are provided. Preferably, the outside diameter of the hollow fibers is about 50 to 800 microns. Often larger diameter hollow fibers (e.g., at least about 350, say, about 350 to 800, microns in diameter) are desired due to the frequently resulting enhanced transverse dispersion of fluid among the hollow fibers with axial fluid flow in the bundle. Generally, the wall thickness of the hollow fibers is at least about 5 microns, and in some hollow fibers, the wall thickness may be up to about 200 or 300 microns, say, about 50 to 200 microns. With hollow fibers fabricated from materials having lesser strengths, it may be necessary to employ larger fiber diameters and wall thicknesses to impart sufficient strength to the hollow fiber.

In order to provide desirable fluxes through the hollow fibers, particularly using those hollow fibers having walls at least about 50 microns in thickness, the hollow fibers may have a substantial void volume. Voids are regions within the walls of the hollow fibers which are vacant of the material of the hollow fibers. Thus, when voids are present, the density of the hollow fiber is less than the density of the bulk material of the hollow fiber. Often, when voids are desired, the void volume of the hollow fibers is up to about 90, say, about 10 to 80, and sometimes about 20 or 30 to 70, percent based on the superficial volume, i.e., the volume contained within the gross dimensions of the walls of the hollow fibers. The density of the hollow fiber can be essentially the same throughout its wall thickness, i.e., isotropic, or the hollow fiber can be characterized by having at least one relatively dense region within its wall thickness in barrier relationship to fluid flow through the wall of the hollow fiber, i.e., the hollow fiber is anisotropic. Generally, a relatively dense region of anisotropic hollow fibers is substantially at the exterior of the hollow fiber.

Particularly advantageous hollow fibers for use in axially-fed permeators in accordance with this invention are hollow fibers having low amplitude waves, or crimps, such as disclosed by Leonard in U.S. patent application Ser. No. 855,853, filed Nov. 30, 1977, herein incorporated by reference.

It is claimed:

1. A permeator for separating by the selective permeation of at least one fluid from a fluid mixture containing at least one other component comprising an elongated, essentially fluid impermeable tubular shell having at least one end adapted to receive a tube sheet; a plurality of selectively permeable hollow fibers, said hollow fibers having an exterior surface and a bore and said hollow fibers being generally parallely positioned within the shell in the form of an elongated bundle wherein the bundle substantially completely fills the cross-section of the tubular shell; at least one tube sheet, said tube sheet being in fluid tight relationship with said shell wherein at least one end of each of said hollow fibers is embedded in a fluid tight relationship in said at least one tube sheet and wherein said bores of said hollow fibers communicate through said tube sheet; at least one fluid ingress port communicating through said shell and at least one longitudinally distant fluid egress port communicating through said shell, said ingress and egress ports being in communication with the exterior surface of the hollow fibers and adapted to provide axial flow of fluid in said shell; and at least one fluid flow diverter in said bundle, said fluid flow diverter comprising a region of a plurality of hollow fibers embedded in an essentially fluid tight relationship in a solid wherein the cross-section of said fluid flow diverter which is transverse to the orientation of the hollow fibers is a minor portion of the transverse cross-section of said bundle sufficient to divert and enhance dispersion of fluid flow within the bundle.

2. The permeator of claim 1 in which the packing factor of hollow fibers adjacent to said at least one fluid flow diverter is substantially uniform.

3. The permeator of claim 1 in which the packing factor based on the inside cross-sectional dimensions of the shell and the cross-sectional area of the hollow fibers is at least about 35 percent.

4. The permeator of claim 3 in which the packing factor based on the inside cross-sectional dimensions of the shell and the cross-sectional area of the hollow fibers is about 45 to 60 percent.

5. The permeator of claim 1 in which the effective flow diverter surface area of a fluid flow diverter is less than about 25 percent of the interior cross-sectional area of the shell.

6. The permeator of claim 5 in which the effective flow diverter surface of a fluid flow diverter is about 2 to 25 percent of the interior cross-sectional area of the shell.

7. The permeator of claim 6 in which the thickness of a fluid flow diverter is less than about 5 centimeters.

8. The permeator of claim 6 in which the minor effective diverter dimension of a fluid flow diverter is less than about 20 centimeters.

9. The permeator of claim 6 having at least two fluid flow diverters which are less than 2 meters apart.

10. The permeator of claim 5 in which a fluid flow diverter extends around the periphery of the bundle.

11. The permeator of claim 10 in which said fluid flow diverter which extends around the periphery of the bundle contacts the interior surface of the shell.

12. The permeator of claim 11 in which a fluid flow diverter is within about 25 percent of the length of the bundle to a said at least one fluid ingress port.

13. The permeator of claim 12 in which a fluid flow diverter is within about 50 centimeters to a said at least one fluid ingress port.

14. The permeator of claim 11 in which a fluid flow diverter is within about 25 percent of the length of the bundle to a said at least one fluid egress port.

15. The permeator of claim 14 in which a fluid flow diverter is within about 50 centimeters to a said at least one fluid egress port.

16. The permeator of claim 5 in which a fluid flow diverter is within the bundle.

17. The permeator of claim 16 in which said fluid flow diverter within the bundle is adapted to support at least said hollow fibers embedded in the solid.

18. The permeator of claim 16 in which said fluid flow diverter within the bundle is a rod.

19. The permeator of claim 16 having at least two fluid flow diverters which are off-set.

20. The permeator of claim 1 in which the hollow fibers have an outside diameter of about 50 to 800 microns.

21. The permeator of claim 20 in which the hollow fibers have an outside diameter of about 350 to 800 microns.

22. The permeator of claim 1 in which the diameter of the bundle is about 0.02 to 0.5 meter and the length of the bundle is about 1 to 10 meters.

* * * * *